Patented Oct. 24, 1944

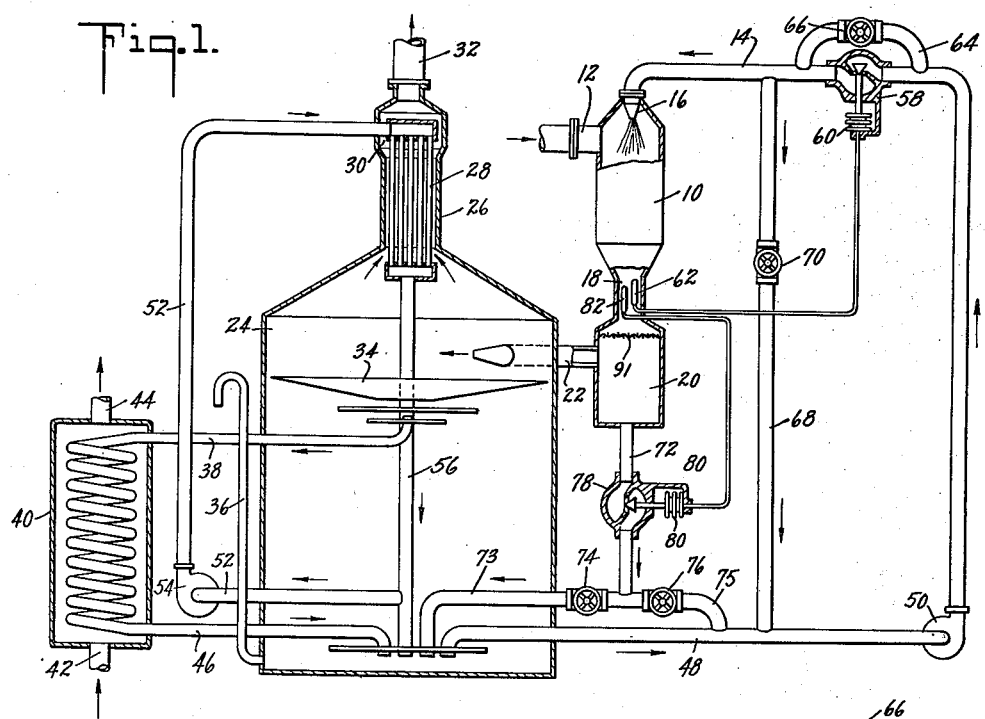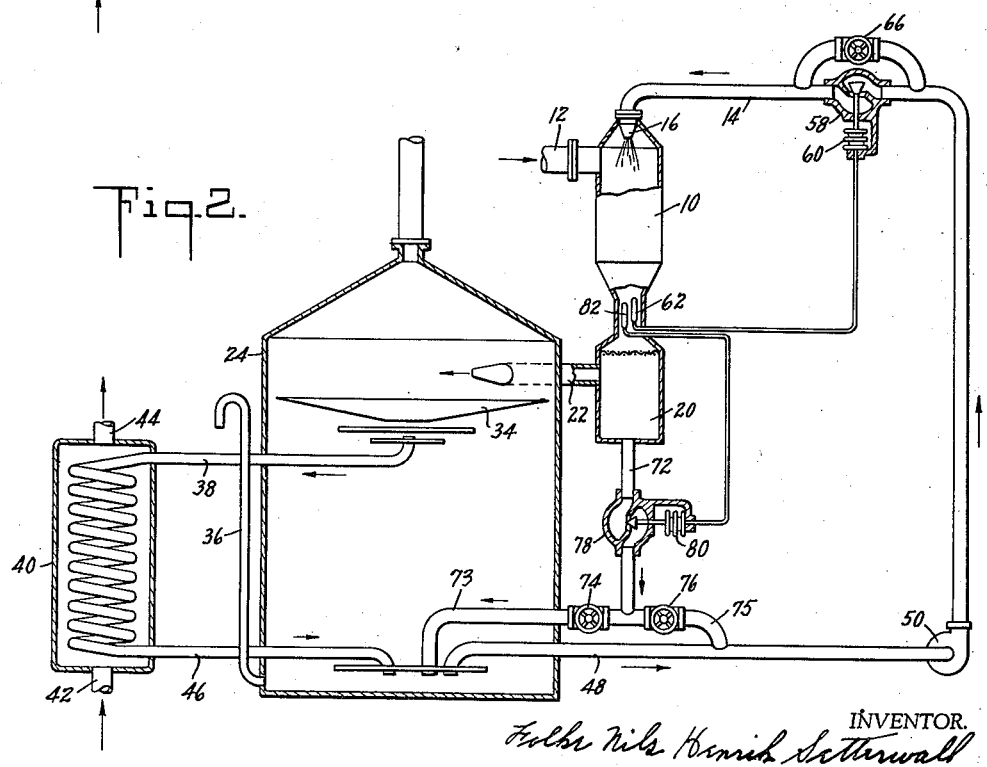

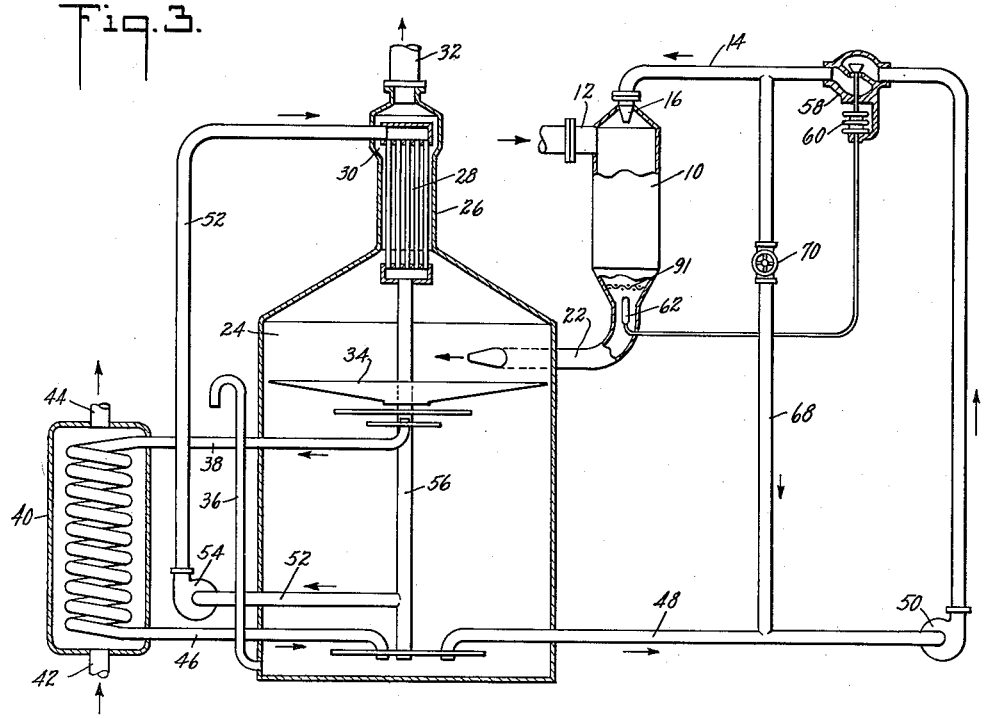
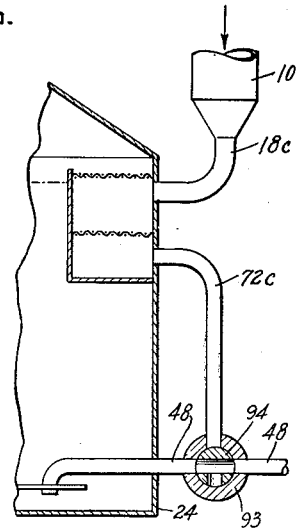
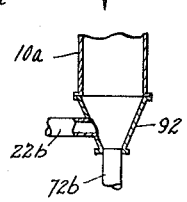

2,360,900

UNITED STATES PATENT OFFICE 2,360,900

HEAT RECLAIMING SYSTEM

Folke Nils Henrik Setterwall, Stockholm, Sweden, assignor, by mesne assignments, to American Heat Reclaiming Corporation, New York, N. Y., a corporation of New York Application September 20, 1938, Serial No. 230,825

9 Claims. (Cl. 261—39)

The present invention relates to heat reclaiming systems and has particular reference to that class of systems for reclaiming heat from intermittently supplied gaseous mixtures which may be either of wholly condensible nature or may be constituted of condensible gases or vapors mixed with incondensible gases.

Still more particularly, the invention relates to the above class of systems for reclaiming heat from waste products containing impurities, in solution or otherwise, and in which the heat thereof is reclaimed by cooling and/or condensing the intermittently supplied hot products by contact with a cooling liquid to prepare a hot liquid to be used as a heat transfer agent for heating a service medium and thereafter to be returned for use again as a cooling or condensing agent for the hot gaseous products. Still more particularly the invention relates to systems of the kind above described in which the liquid constituting the heat transferring agent is accumulated in its hot and/or cooled state, as the case requires, until it is actually needed for the purposes of cooling or condensing the heat delivery products or heating the service medium, or both, in order to equalize as far as possible all differences between the supply of heat entering the system and the demand for heat therefrom.

In systems of the kind above referred to, it is important that the feed of cooling liquid to the heat delivering products be regulated in accordance with the amount of heat supplied, advantageously in accordance with the temperature of the hot liquid obtained by mixture of the cooling liquid with the hot products, so that the temperature of the hot liquid is maintained approximately constant at a relatively high temperature, say near the boiling point of the liquid, regardless of variations in the load on the system. This is desirable in order to insure high heat reclaiming efficiency and it is evident that in order to maintain such high efficiency, the mixing of any substantial quantity of liquid of lower temperature with the hot liquid should be avoided.

In systems of the general character under discussion as at present constructed, it is however in practice very difficult to avoid loss of heat during starting periods because of lag in the operation of conventional controlling devices due to insufficient sensitivity thereof. Also, it is difficult to avoid mixture during idle periods of relatively cool liquid with the hot liquid intended for heating purposes due to leakage in the control valve or valves for the feed of cooling liquid at times when the latter should be shut off. Thus, for example, lag in the operation of control devices results in escape of a substantial quantity of heat delivering products, without giving up all of their heat, when a renewed supply of such products is delivered to the system after it has been inoperative for a while, because of the fact that the control of the feed of cooling liquid is not opened with sufficient rapidity upon starting to cause enough cooling liquid to be admitted to take care of the entire available heat of the first of the renewed supply of heat delivering products. The losses resulting from such lag may be very heavy, particularly in those instances where the supply of heat delivering products is not only intermittent, but also intermittently supplied at frequent intervals, as is the case in many plants, so that the heat reclaiming system is operating a large proportion of the time under starting and stopping conditions rather than under the relatively stabilized conditions of continuous operation.

Further, leaky control valves for the control of the feed of cooling liquid, which in such systems are difficult to maintain fluid tight, result during idle periods in liquid in cool state being delivered in systems of known character direct to the accumulated hot liquid, with the result that the supply of hot liquid is lowered in temperature by the leakage water, and the efficiency of the system in transferring heat to the service medium correspondingly impaired.

A primary object of the present invention is to eliminate the deficiencies of the above noted character in systems of the kind under consideration and to increase the heat reclaiming efficiency thereof.

With this end in view the invention contemplates in one of its phases the by-passing of any leakage of cooling liquid during inactive periods, when no heat delivering products are available, before such leakage liquid can reach the accumulated hot liquid supply, so as to return the leakage liquid into the system at another place to be again used as cooling liquid. In another of its phases the invention contemplates directing the cooling liquid, which may consist only of leakage liquid, so as to forward it to the heat exchanger for heating the service medium only under conditions when such liquid has reached at least a desired minimum temperature, while under other conditions directing it so as to mix it with returning cooling liquid. A still further phase of the invention contemplates the maintenance of a determined minor feed of cooling liquid ahead of any supply of heat delivering products and the collection of such liquid, which is not heated sufficiently for purposes of heating the service medium, together with the supply of cooling liquid to be recirculated in the system.

For a more complete understanding of the primary objects of the invention and other and more detailed objects thereof appearing in connection with the several phases of the invention, together with the manner in which the several objects and the advantages to be derived from use of the invention are realized, reference may best be had to the ensuing portion of this specification in which the invention, in its several phases, is described.

In the accompanying drawings forming a part hereof:

Fig. 1 is a more or less diagrammatic view, chiefly in cross section, showing a plant embodying various features of my invention;

Fig. 2 is a view similar to Fig. 1, but simplified by the omission of certain parts;

Fig. 3 is a view similar to Fig. 1 but simplified by the omission of certain other parts;

Fig. 4 is a cross sectional view of another embodiment of my invention;

Fig. 5 is a cross sectional view of a further embodiment of my invention;

Fig. 6 is a cross sectional view of still another embodiment of my invention;

Referring now to Fig. 1, 10 designates a contact cooler of any suitable design such, for example, as a jet condenser having at its upper end an inlet 12 through which the heat delivering products are supplied and a feed pipe 14 through which cooling liquid is supplied to a jet 16 or the like for mixture with the products delivered through the inlet 12. Insofar as the present invention is concerned other specific types and designs of cooler may be employed.

In this apparatus, the heat delivering gaseous products give up most of their heat to the cooling liquid to form a hot liquid which includes the cooling liquid and the condensate of any steam or other condensible products that may be supplied to the condenser. Any incondensible gases are cooled and carried with the hot liquid for discharge therewith through the common outlet 18 at the bottom of the condenser. In the embodiment illustrated, the discharge from the condenser is delivered first to an auxiliary receptacle 20 which during operation periods is filled with liquid so that the discharge from the condenser will flow, in the form of an overflow through the main delivery conduit 22, into the upper portion of the space within the accumulator tank 24.

If any uncondensed vapors or gases are contained in the products delivered through the conduit 22, these will be separated in the accumulator tank from the hot liquid and flow upwardly to be passed through an auxiliary cooler 26 which may be of any desired type and which in the present instance is shown in the form of a surface cooler having a bank of cooling tubes 28 extending therethrough and around which the gaseous products flow through space 30 to the outlet or stack 32.

The hot liquid delivered through conduit 22 to the accumulator 24 is collected on top of the liquid already present in the accumulator by means of what may be termed a damping device which in the present embodiment is in the form of the guide and baffle plates indicated generally at 34 which operate to decelerate the flow of incoming liquid so that it does not unduly agitate and mix with the accumulated liquid. During normal operation, the accumulated liquid is maintained at a fixed level by any suitable means, which in the present instance is provided by the overflow pipe 36.

By this means at least the top layer of liquid adjacent to the fixed level will consist of hot liquid, which hot liquid is withdrawn through the pipe 38, the inlet end of which is located just below the surface level of the liquid in the accumulator. Advantageously, the hot liquid which is drawn through pipe 38 may be passed through a heat exchanger of the surface type indicated generally at 40, for the purpose of heating a service medium entering the exchanger through the inlet 42 and leaving the same through the outlet 44. From the heat exchanger 40, the liquid withdrawn from the accumulator, which has been cooled in its passage through the exchanger, is returned to the bottom of the accumulator by the return pipe 46, and as may be required, accumulated in the bottom portion of the accumulator or recirculated immediately or later on through the circulating pipe 48 through which liquid is withdrawn from the bottom portion of the accumulator and from which it is returned as cooling liquid to the feed pipe 14 by means of the circulating pump 50.

By the above described means there will be provided in the accumulator a bottom layer of relatively cool liquid beneath a top layer of hot liquid and the relative heights of these different layers will vary in accordance with the differences between the supply of heat afforded by the hot products delivered to the condenser and the demand for heat to be delivered to the service medium. These differences will be compensated for by variation in the relative amounts of hot and cool water in the accumulated supply of liquid, which will act as an equalizer, and there will be required to be removed from the system only such excess liquid as may be represented by condensate obtained from the hot products delivered to the condenser.

While for purposes of illustration the accumulated supply has been shown as contained in a single accumulator, it will be obvious that the accumulated supply may with equal facility be maintained in separate accumulating reservoirs for hot and cool liquid, respectively.

The auxiliary cooler 26 is advantageously placed at the top of the accumulator tank as illustrated and in accordance with one phase of the present invention it is fed with cooling liquid from a source of relatively cool liquid within the system. In the present embodiment the feed of cooling liquid to the auxiliary cooler is shown as being taken from the bottom portion of the accumulator tank through the supply pipe 52 in which is located the feed pump 54. From the auxiliary cooler, the cooling liquid is returned to the portion of the system where the cool water is accumulated or may be returned directly to the supply pipe leading to the feed pump, as indicated in Fig. 1, where the return pipe 56 is shown as leading to the bottom of the accumulator and also in communication with the inlet end of the supply pipe 52.

It is to be noted that the heat recovered in the auxiliary cooler is relatively small, and the heat recovered in the water circulated through the auxiliary cooler is transferred to the large volume of cooling liquid in the accumulator so that while the heat thus recovered is eventually utilized in the system, an undue rise in the temperature of the cooling liquid is eliminated.

In accordance with one phase of operation in accordance with the invention, a small or minor constant quantity of cooling liquid is continuously circulated through the auxiliary cooler 26, regardless of whether heat delivering products are being supplied or not, and this quantity is determined so as to be capable of taking care of the maximum amount of heat which may be expected to be contained in the gaseous products reaching the cooler immediately after starting operation of condenser 10, before stabilized conditions and efficient operation of the latter has been established. By this mode of operation it is possible to prevent escape of any of the heat delivering products under any conditions of operation, without such products first properly giving up their heat to the system.

In order to regulate the feed of cooling liquid to the condenser 10, there is provided, in the embodiment illustrated, a control valve 58 in the feed pipe 14. Valve 58 is controlled by any suitable governing mechanism operable in response to a temperature responsive member in accordance with the temperature of the products discharged from the condenser 10. In the arrangement diagrammatically illustrated in the figure, the valve 58 is shown as being operated by a bellows mechanism 60 which is in turn responsive to a thermostatic element 62 placed in the outlet of the condenser 10. It will be apparent that any mechanical equivalent of the control device illustrated may be employed within the scope of the invention and further and more detailed description of such apparatus is accordingly not required herein for an understanding of the principles of the invention.

In accordance with one phase of the operation contemplated by the invention, the control valve 58 is supposed to shut off entirely the feed of cooling liquid whenever the flow of heat delivering products to the condenser is interrupted, in other words, during inactive periods, the control being set to close the valve in response to the low temperature obtaining at the outlet of the condenser during such inactive periods. Upon the admission of heat delivering products to the condenser after an inactive period, the resultant rise in temperature at the outlet of the condenser causes the control valve to commence opening the feed pipe so as to regulate the rate of feed in accordance with the load, the effect of the temperature responsive control of the valve being to maintain the discharge from the condenser at a constant predetermined value.

Advantageously, the feed pipe may be provided with a by-pass 64 around the control valve 58, this by-pass being provided with a throttle valve 66. When the apparatus is operated as above described, with the control valve 58 closed during inactive periods, the by-pass valve 66 would be closed and the by-pass rendered inoperative. As will hereinafter be explained, however, the by-pass 66 may be utilized to advantage when different variants of the mode of operation are resorted to.

It will be evident that due to unavoidable lag in the operation of the control mechanism for opening valve 58, some time must necessarily elapse after heat delivering products are supplied following an inactive period before the control valve 58 is opened and adjusted in accordance with the load. During this time a considerable quantity of heat delivering products may be discharged from the condenser in a hot state and in such case the heat thereof is recovered by the auxiliary cooler 26 so that the heat is recovered in the system without undue losses.

In systems of the kind under discussion, the quantities of heat delivering products supplied are frequently of very large value and large feed pipes and control valves must be employed to handle the quantities of cooling liquid required to handle the heat delivering products supplied to the condenser. As a result, in practice, there will usually be some leakage of cooling liquid through the control valve even when it is supposed to be closed. Such leakage, if not otherwise taken care of, would flow through the condenser and be delivered therefrom while still in a cool state to the accumulated supply of hot liquid, with which it would mix and which it would cool to a temperature below the desired temperature. It will readily be seen that if the system is employed in connection with a plant where the inactive periods between delivery of hot products are of considerable length, such leakage of cooling liquid, even though at a small rate, might readily result in substantial total quantities of cool liquid being delivered to the accumulated hot liquid supply.

In accordance with one phase of the present invention, provision is made to prevent flow of leakage liquid to the accumulated hot water supply. This is accomplished by providing by-pass means whereby the leakage liquid may be diverted at some point in the apparatus between the control valve and the delivery to the accumulated hot water supply. This may be accomplished in different ways as will hereinafter more fully appear. In the embodiment of apparatus under consideration, one such by-pass means for diverting the leakage liquid is provided by the drain pipe 68 connecting the feed pipe 14 of the discharge side of the control valve, with the circulating pipe 48 leading to the pump 50. In the embodiment illustrated, pipe 68 is provided with a control valve 70 by means of which the maximum amount of flow through the drain pipe may be regulated, but it will be evident that the area for flow through the drain pipe itself may be utilized to determine the maximum quantity of drainage through this pipe. When a drain pipe of the kind just described is employed, it will be evident that it may readily be utilized to divert whatever quantity of leakage liquid passes the control valve to a cool zone in the system. In the present instance, this cool zone is the circulating pipe leading from the pump 50, but it will be apparent that the diverted leakage liquid may be delivered by the drain pipe to other cool zones in the system. The drain pipe may conveniently remain open during active periods when the valve 58 is open and under such conditions a small quantity of cooling liquid will continue to pass through the drain pipe for re-circulation in the system. It will be evident, however, that if desired, the drain pipe may be shut off during active periods.

If a by-pass for leakage liquid is provided by the separate drain pipe 68, as above described, it will be apparent that the discharge from the condenser 10 may be arranged so as to at all times deliver to the accumulated hot water supply and with such an arrangement, which is relatively very simple, dilution and cooling of the hot liquid supply is prevented and full recovery of heat is obtained by use of the auxiliary cooler 26 in combination with the condenser 10, as previously described.

While diversion of leakage liquid from the hot water supply may be accomplished through a separate drain pipe, such diversion may be accomplished in other ways, and to this end the auxiliary receptacle 20 from which the main delivery to the hot water supply passes in the form of an overflow may advantageously be employed. In the system shown in Fig. 1, the auxiliary receptacle 20 is provided, in addition to the main delivery 22 leading from the upper part of the receptacle, with a lower discharge or drainage pipe 72, the delivery end of which may be opened either to the bottom of the accumulator tank 24 through the branch pipe 73 controlled by the valve 74, or directly to the circulating pipe 48 through the branch 75 which is controlled by valve 76. The discharge pipe 72 is provided with a control valve 78 which is governed in accordance with temperature conditions at the outlet of the condenser 10. In the embodiment shown, the valve 78 is illustrated as being under the control of a bellows 80, the operation of which is responsive to the thermostatic element 82 located in the discharge of the condenser. While for purposes of clarity, separate thermostatic elements have been shown in the discharge of the condenser for controlling valves 58 and 78, it will be apparent that since the temperature condition affecting both of these elements is the same, a single thermostatic element may be readily employed to provide the operating impulse for both valves.

From inspection of Fig. 1 it will be apparent that for the purpose of diverting cool water from the hot water supply during inactive periods, the auxiliary receptacle 20 and the connection provided by the discharge pipe 72 and either one of its branches 73 or 75 will function substantially like the drain pipe 68. If it be assumed for the moment that the valve 70 is closed so that leakage water flows to the condenser during inactive periods, such leakage water will drain to the bottom of the receptacle 20 and through the discharge pipe to a cool zone in the system, without overflowing through the delivery 22 into the hot accumulated liquid. In so far as the receptacle 20 and discharge conduit 72 may operate to take care of leakage liquid, the valves 74, 76 and 78 may be omitted, these valves, however, being useful for other purposes as will hereinafter be more fully set forth.

By way of example let it be assumed that in the embodiment under discussion the valve 70 is closed, valve 78 is set so as to be open by only a relatively small amount when the thermostatic element 82 is cold, valve 74 is closed and valve 76 is open. Under such conditions, during inactive periods, any liquid leaking past valve 58 will flow through the condenser 10, receptacle 20, discharge pipe 72, and branch 75 back to the circulating pipe 48, thus being diverted from the accumulated hot water supply. If now under the assumed conditions an active period commences and heat delivery products are supplied, valve 58 will be opened and the augmented supply delivered from the condenser will fill the receptacle 20 until overflow through the main delivery 22 occurs. Such overflow will, however, be hot liquid since under the conditions assumed, heat delivery products will have been admitted to the condenser. If the discharge conduit 72 is maintained constantly open under all conditions, either by omission of valve 78 or by use of a fixed minimum opening through the valve, a certain amount of liquid, corresponding to the maximum anticipated amount of leakage liquid will be diverted during active periods as well as during inactive periods, but this quantity is relatively so small as compared with the total quantity of liquid delivered during active periods, that it may in many instances be permitted to pass to a cool zone without having material effect on the temperature in the liquid of the zone to which it is diverted.

In some instances it may be advantageous to maintain circulation of a predetermined amount of cooling liquid through the condenser 10 during inactive periods so that such cooling liquid will be present in the condenser when heat delivering products are first supplied thereto after an inactive period and before such heat delivering products can act on the thermostatic element which opens the control valve for the cooling liquid.

This variant of the method of operation may readily be effected with the apparatus disclosed by either setting the control valve 58 to have a predetermined minimum opening or by adjusting the by-pass valve 66 to have the desired degree of opening. If cooling water is permitted to pass through the condenser during inactive periods, such cooling water will be prevented from flowing to and mingling with the accumulated hot water supply in the same manner as leakage liquid escaping through valve 58, namely, by flow through the auxiliary receptacle 20 and the discharge pipe 72, it being understood, of course, that if cooling water circulation is maintained during inactive periods, the valve 78 will be set to have an opening sufficient to take care of whatever flow is permitted during such inactive periods either through valve 58 or by-pass valve 66, as the case may be.

When operating in this particular manner, it is preferable to regulate the return flow through the discharge pipe 72 by means of valve 78 so that after an active period has commenced and as soon as the desired minimum discharge temperature from the condenser has been attained, valve 78 will be closed and all of the hot liquid discharged from the condenser delivered from the main delivery 22 to the accumulated hot liquid supply. It is for this purpose that the thermostatic control of valve 78 is provided, as indicated in the drawings, whereby upon rise in temperature to desired degree at the discharge of the condenser, valve 78 is closed in response to the action of the thermostatic element 82.

From the foregoing description of the apparatus illustrated in Fig. 1, it will be evident that a number of different variations of method of operation may be employed depending upon the nature of the hot products delivered and the relation between the duration of the active and inactive periods of operation. Thus the apparatus illustrated in Fig. 1 is what may be said to be of universal nature, capable of adjustment to different variations of the general mode of operation in order to take care of different conditions to which the system must be adjusted.

In many instances it is, however, unnecessary to provide all of the elements of apparatus shown in Fig. 1 in order to carry out the primary object of the invention, which is to insure the recovery of the maximum amount of heat from heat delivering products which are intermittently delivered, and to maintain the recovered heat in the form of a hot liquid supply which is at all times in a condition most efficiently available for transfer of the recovered heat to a service medium.

In order to make this more clear, typical examples of arrangements whereby portions of the apparatus illustrated in Fig. 1 may efficiently be employed to accomplish the objects of the invention will now be described, it being understood that other specific arrangements may be employed within the scope of the invention to handle the particular requirements of different types of plants delivering hot gaseous products from which heat is to be recovered.

In Fig. 2 the arrangement is illustrated which is suitable for use in cases where the heat delivering products are entirely or substantially entirely of a condensible nature, such for example as steam. This arrangement is in general similar to the arrangement shown in Fig. 1 except for the omission of the by-pass drain pipe 68 and valve 70 and the omission of the auxiliary cooler 26 together with its cooling liquid circulating system comprising the parts 52, 54, 56 of Fig. 1.

In the arrangement shown in Fig. 2, the provision of the auxiliary receptacle 20 eliminates the necessity for a separate by-pass drain to take care of the leakage liquid. Advantageously the system shown is operated with the control valve 58 or the by-pass valve 66 adjusted so that a predetermined minimum quantity of cooling water is circulated through the condenser 10 at all times, the valve 78 being adjusted for a maximum opening which will permit this predetermined quantity of water to flow from the receptacle 20 to a cool zone in the system during inactive periods, without overflow through the delivery 22 to the accumulator 24.

With the system operated in this manner, and it being assumed that the hot products delivered to the system are of a condensible nature, the circulation of the cooling water during the inactive periods operates to prevent escape of any of the gaseous products from the system at the commencement of an active period. The reason for this will be evident since the presence of the cooling liquid in the condenser at all times will operate to immediately condense the first product delivered to the condenser and since the condensation of these products will immediately tend to raise the discharge temperature from the condenser, the valve 58 will be open to take care of the momentary load of the active period and as soon as the required minimum temperature of the hot products discharged from the condenser has been reached, valve 78 will be closed so that all such products will be delivered to the accumulated supply in the accumulator 24. Since, as assumed, steam or other substantially wholly condensible gas forms the supply of heat delivering products, all of these products can be condensed in the condenser 10 during active periods so that the auxiliary cooler may be dispensed with in so far as further recovery of heat from products discharged from the condenser is concerned. Also, because of the continuous circulation of cooling liquid through the condenser, the auxiliary cooler is not required to prevent loss of heat due to escape of hot gaseous products through the condenser at the beginning of an active period before the cooling water control valve can be opened in response to the commencement of a renewed supply of such hot products.

In the arrangement shown in Fig. 3, another embodiment of apparatus is illustrated which is suitable for use under other operating conditions as, for example, where the heat delivering products include substantial quantities of uncondensible gases as well as condensible gases or vapors.

In this embodiment the drain pipe 68 is employed, as is also the auxiliary cooler 26, and there is omitted the auxiliary receptacle 20 of Figs. 1 and 2 for receiving the discharge from the condenser, together with the discharge pipe 72 and associated valves. Instead the condenser discharges directly to the accumulator 24 through the delivery conduit 22 which forms the sole outlet from the condenser. Also, the by-pass pipe 64 and its associated valve, for by-passing the control valve 58 is omitted.

With this apparatus the control valve 58 is adjusted so as to be closed so that no cooling liquid passes this valve during inactive periods except leakage liquid. Since any leakage liquid passing valve 58 would otherwise pass through the condenser during inactive periods to the accumulated hot water supply, the separate drainage by-pass 68 for leakage liquid is provided and it will of course be understood that in the arrangement shown, the valve 70, if a valve is employed, is kept open during inactive periods sufficiently to permit whatever amount of leakage liquid there may be to flow through the drain and thus by-pass the condenser.

The omission of the auxiliary receptacle 20 for receiving the products discharged from the condenser results in the passage of a certain quantity of hot gaseous products through the condenser to the accumulator during the starting period following an inactive period, this being due to unavoidable lag in the means for opening the control valve 58. For this reason the auxiliary cooler 26 is employed, which operates to extract the heat from the first gaseous products passing through the condenser and which, during normal operation in an active period, even after the condenser has been stabilized as to operation and is condensing all of the condensible products delivered to it, to further cool and efficiently extract heat from the uncondensible products which pass in gaseous state through the condenser even under stabilized conditions during active periods.

Figs. 4 and 5 show different embodiments of discharge devices for the jet condenser. As shown in Fig. 4 there may be used an enlarged overflow passageway constituting a closed receptacle 20a which has a partition 90 extending from its bottom and forming a brim adjacent to its top. Thus, the receptacle 20a is divided into two separate chambers which communicate with each other above the brim of the partition 90, and the jet condenser discharges into the first chamber, which is drained by means of the branch pipe 72a, whereas any gases are separated from the liquid in the upper part of the receptacle 20a and flow into the second chamber and therefrom out through the discharge pipe 22a into the top space of the accumulator. Under all conditions, the liquid is first collected in the first chamber mentioned. If the volume of liquid is small it is drained from this chamber through the pipe 72a, and hence does not pass through the conduit 22a to the accumulator. When the discharge of liquid is greater than the quantity which may flow through the pipe 72a or if the same is closed, the first chamber will be filled with liquid, whereby the liquid overflow into the second chamber and therefrom through the discharge pipe 22a into the top of the accumulator to be used as heating liquid. Reference character 91 indicates a sieve for withholding solids which should be excluded from the system, such a sieve being shown also in Fig. 1. A similar discharge device may also be provided within the casing of the jet condenser as illustrated by Fig. 5. The bottom part 92 of the jet condenser 10a serves as an overflow passageway or receptacle and has in this case an overflow discharge pipe 22b connected at an elevation above the pipe 72b as in Fig. 1.

According to the invention the system can be constructed to operate so that relatively hot liquid is circulated through the jet condenser during intervals between working periods, and Fig. 6 shows part of a plant with a modification which is particularly well suited for such operation. As illustrated, open receptacle 20c is placed in the interior of the accumulator 24 in the upper part thereof so that the upper edge of the receptacle is situated somewhat above the constant liquid level in the accumulator. The jet condenser discharges into the receptacle 20c through the outlet pipe 18c and any liquid discharge may in the first instance be withdrawn through the branch pipe 72c and returned to the circulating pipe 48. At the junction of those pipes there is conveniently provided a three way-valve 93. Thus during working of the jet condenser the valve 93, in the position shown, closes the reflux through the discharge pipe 72c, while maintaining the circulating pipe 48 alone open. Under these conditions the discharge will fill the receptacle 20c and overflow into the accumulator. When the supply of heating products to the jet condenser is reduced and the discharge temperature of the same falls beneath the desired point, the valve member 94 of the valve 93 may be rotated 90° in a counter-clockwise direction to connect pipe 72c with the part of pipe 48 to the right of the valve to provide a constant reflux of a certain minor quantity of liquid discharge. At the same time the connection through the left part of circulating pipe 48 from the bottom of the accumulator is closed. Then the liquid discharge is still relatively hot and is directly recirculated by the pump 50 back to the jet condenser again while still in the hot state without mixing with any cooled liquid. It is understood that the arrangement illustrated in Fig. 6 is part of a plant which in all other respects corresponds to Fig. 2.

A system as described in Fig. 2 with means for returning liquid from the jet condenser through a valved branch pipe 72 and pipe 75 direct to the circulation pipe 48, can be operated without any additional control means in the feed pipe 14. In such case the feed of cooling liquid to the jet condenser is maintained constant irrespective of the load at a quantity corresponding to the top load and of course the same quantity is circulated also during interruptions in the heat supply. The control valve 78 in the discharge pipe 72 is regulated in accordance with the discharge temperature of the jet condenser so as to return all liquid discharge which is not heated to the desired point for direct feed again through the connection 75 and the circulation pipe 48. This is effected in a manner similar to that already disclosed so that all the cooling liquid is thus recirculated at times of a failing heat supply, while at full load no liquid at all is returned, but by the closing of valve 78, is caused to flow to the accumulator. At reduced loads, however, there is recirculated more or less hot liquid in accordance with the load, while the remaining quantity required for a constant feed is simultaneously withdrawn from the accumulator, so that a mixture having the right feed temperature is obtained, whereby that temperature is accommodated so as to maintain the discharge temperature constant at the desired point.

It is understood that many changes can be made in other details without deviating from the scope of the invention which is not limited otherwise than by the appended claims. In particular it should be noticed that in the system there can also be used two or more like mixing coolers connected in parallel, whereby there may be provided a single auxiliary cooler for all of them.

What I claim and desire to secure by Letters Patent is:

1. That improvement in the operation of a heat reclaiming system of the kind in which intermittently supplied hot gaseous products are cooled by the aid of a contact cooler which delivers hot liquid during periods of normal active operation through a main delivery to the upper part of an accumulated supply of liquid, which includes reducing the feed of cooling liquid during inactive periods when hot gaseous products are not supplied, and by-passing said reduced feed around said main delivery and around said upper part of the accumulated liquid for recirculation in the system during said inactive periods.

2. That improvement in the operation of a heat reclaiming system of the kind in which intermittently supplied hot gaseous products are cooled by the aid of a contact cooler which delivers hot liquid during periods of normal active operation through a main delivery to the upper part of an accumulated supply of liquid, which includes reducing the feed of cooling liquid during inactive periods when hot gaseous products are not supplied, by-passing said reduced feed around said main delivery and introducing it into the lower part of said accumulated supply during said inactive periods.

3. That improvement in the operation of a heat reclaiming system of the kind in which intermittently supplied hot gaseous products are cooled by the aid of a contact cooler which delivers hot liquid during periods of normal active operation through a main delivery to the upper part of an accumulated supply of liquid, which includes reducing the feed of cooling liquid during inactive periods when hot gaseous products are not supplied, and by-passing said reduced feed around said contact cooler and said main delivery and around said upper part of the accumulated liquid for recirculation in the system during said inactive periods.

4. That improvement in the operation of a heat reclaiming system of the kind in which intermittently supplied hot gaseous products are cooled by the aid of a contact cooler which delivers hot liquid during periods of normal active operation through a main delivery to the upper part of an accumulated supply of liquid, which includes reducing the feed of cooling liquid during inactive periods when hot gaseous products are not supplied, passing said reduced feed through the contact cooler, and by-passing said reduced feed around said main delivery and around said upper part of the accumulated liquid for recirculation in the system during said inactive periods.

5. That improvement in the operation of a heat reclaiming system of the kind in which intermittently supplied hot gaseous products are cooled by the aid of a contact cooler which delivers hot liquid during periods of normal active operation through a main delivery to the upper part of an accumulated supply of liquid, which includes reducing the feed of cooling liquid during inactive periods when hot gaseous products are not supplied, passing said reduced feed through the contact cooler, by-passing said reduced feed around said main delivery, and introducing it into the lower part of said accumulated supply during said inactive periods.

6. In a system for reclaiming heat from intermittently supplied hot gases, a hot water accumulator, a contact heat exchanger, means to supply said hot gases to said heat exchanger, means to supply liquid to be heated to said heat exchanger, means providing a main delivery for heated liquid from said heat exchanger to the upper part of said accumulator, means for reducing the supply of liquid to be heated during inactive periods when hot gases are not supplied, and means for by-passing the reduced supply of liquid around the main delivery means and around the upper part of said accumulator for recirculation in the system.

7. In a system for reclaiming heat from intermittently supplied hot gases, a hot water accumulator, a contact heat exchanger, means to supply said hot gases to said heat exchanger, means providing a main delivery for heated liquid from said heat exchanger to the upper part of said accumulator, means for reducing the supply of liquid to be heated during inactive periods when hot gases are not supplied, and means for by-passing the reduced supply of liquid around the main delivery means and for introducing it into the lower part of said accumulator.

8. In a system for reclaiming heat from intermittently supplied hot gases, a hot water accumulator, a contact heat exchanger, means to supply said hot gases to said heat exchanger, means to supply liquid to be heated to said heat exchanger, means providing a main delivery for heated liquid from said heat exchanger to the upper part of said accumulator, means for reducing the supply of liquid to be heated during inactive periods when hot gases are not supplied, and means for by-passing the reduced supply of liquid around said heat exchanger and main delivery means and around the upper part of said accumulator for recirculation in the system.

9. In a system for reclaiming heat from intermittently supplied hot gases, a hot water accumulator, a contact heat exchanger, means to supply said hot gases to said heat exchanger, means to supply liquid to be heated to said heat exchanger, means providing a main delivery for heated liquid from said heat exchanger to the upper part of said accumulator, means for supplying said heat exchanger with a reduced quantity of liquid during periods when hot gases are not supplied, and means for by-passing said reduced quantity of liquid from said heat exchanger around the main delivery means and around the upper part of said accumulator for recirculation in the system.

FOLKE NILS HENRIK SETTERWALL.